United States Patent
Jacobsen et al.

(10) Patent No.: US 10,723,459 B2
(45) Date of Patent: Jul. 28, 2020

(54) MODULAR OVERHEAD BIN

(71) Applicant: Airbus Operations GmbH, Hamburg (DE)

(72) Inventors: Sönke Jacobsen, Hamburg (DE); Marcus Gehm, Hamburg (DE); Steffen Elstner, Hamburg (DE); Dieter Krause, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 966 days.

(21) Appl. No.: 14/540,582

(22) Filed: Nov. 13, 2014

(65) Prior Publication Data

US 2015/0069182 A1    Mar. 12, 2015

Related U.S. Application Data

(63) Continuation of application No. PCT/EP2013/059743, filed on May 10, 2013.

(Continued)

(30) Foreign Application Priority Data

May 14, 2012   (DE) ................. 10 2012 009 632

(51) Int. Cl.
  *B64D 13/00*   (2006.01)
  *B64D 11/00*   (2006.01)

(52) U.S. Cl.
  CPC ............ *B64D 11/003* (2013.01); *B64D 13/00* (2013.01); *B64D 2011/0053* (2013.01)

(58) Field of Classification Search
  CPC .............. B64D 11/003; B64D 13/00; B64D 2011/0053
  See application file for complete search history.

(56) References Cited

U.S. PATENT DOCUMENTS 5,716,027 A * 2/1998 Hart ................. B64D 11/003
                                                244/118.1
6,045,204 A * 4/2000 Frazier ............. B64D 11/003
                                                  16/370

(Continued)

FOREIGN PATENT DOCUMENTS

CN       1468779 A     1/2004
DE   102007030331 A1   1/2009

(Continued)

OTHER PUBLICATIONS

German Patent Office, German Search Report for German Application No. 10 2012 009 632.1, dated Jun. 24, 2013.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

An overhead bin for an aircraft comprises a base unit that is designed to fasten the overhead bin to a retaining structure of the aircraft, and a mounting unit that is connected to the base unit. By way of the mounting unit, a stowage space of the overhead bin can be accessed. The base unit provides a first stowage space region, and the mounting unit provides a second stowage space region that together with the first stowage space region forms the stowage space of the overhead bin.

9 Claims, 6 Drawing Sheets

Related U.S. Application Data

(60) Provisional application No. 61/646,432, filed on May 14, 2012.

(56) References Cited

U.S. PATENT DOCUMENTS

| | | | |
|---|---|---|---|
| 7,302,150 B2 * | 11/2007 | Druckman | B64D 11/003 |
| | | | 385/134 |
| 9,090,351 B1 * | 7/2015 | Frazier | B64D 11/003 |
| D775,055 S * | 12/2016 | Sethapun | D12/345 |
| 2006/0132007 A1 * | 6/2006 | Beckley | B60R 7/04 |
| | | | 312/325 |
| 2007/0253674 A1 * | 11/2007 | Druckman | B64D 11/003 |
| | | | 385/147 |
| 2011/0139929 A1 * | 6/2011 | Young | B64D 11/003 |
| | | | 244/118.5 |
| 2011/0253837 A1 | 10/2011 | Lee et al. | |
| 2012/0012702 A1 | 1/2012 | Moritz | |
| 2015/0226243 A1 * | 8/2015 | Schneider | B64C 1/00 |
| | | | 244/131 |
| 2015/0360780 A1 * | 12/2015 | Kammerer | B64D 11/003 |
| | | | 244/118.5 |

FOREIGN PATENT DOCUMENTS

| | | |
|---|---|---|
| DE | 102009014573 A1 | 9/2010 |
| DE | 102009051362 A1 | 5/2011 |
| DE | 102009051363 A1 | 5/2011 |
| DE | 102011116884 A1 | 4/2013 |
| JP | H09267800 A | 10/1997 |
| WO | 2006116074 A1 | 11/2006 |

OTHER PUBLICATIONS

International Searching Authority, International Search Report for International Application PCT/EP2013/059743, dated Aug. 16, 2013.

State Intellectual Property Office of the Peoples' Republic of China, Office Action for Chinese Patent Application No. 201380023591.8 dated Jul. 3, 2015.

* cited by examiner

MODULAR OVERHEAD BIN

CROSS-REFERENCE TO RELATED APPLICATIONS

This is a continuation of International Application No. PCT/EP2013/059743, filed May 10, 2013, which application claims priority to German Patent Application No. 10 2012 009 632.1, filed May 14, 2012 and to U.S. Provisional Patent Application No. 61/646,432, filed May 14, 2012, which are each incorporated herein by reference in their entirety.

TECHNICAL FIELD

This application pertains to an overhead bin for an aircraft, to an aircraft, to an installation system for assembling an overhead bin, and to a method for installing an overhead bin in an aircraft.

BACKGROUND

Usually, in passenger aircraft overhead bins are provided in which passengers can stow their cabin baggage during the flight, which also may be used by the cabin crew for stowing further objects, for example blankets, headrests or child seats.

There are many variants of overhead bins, for example so called fixed bins in which the hinged lid can be opened upwards and in which the bottom of the bin is formed by a wall of the bin, or so called movable bins in which the hinged lid can be opened downwards, thus forming a part of the bottom of the bin.

Different installation variants of overhead bins normally comprise different interfaces to the primary structure of the aircraft. The same applies to the interfaces for the passenger service unit or personal service unit, PSU in the respective variants. As a rule, a conversion to another installation variant is very expensive. For example, the cabin panels must be deinstalled, and new retainers must be installed on the primary structure at different positions.

In addition, other objects, desirable features and characteristics will become apparent from the subsequent summary and detailed description, and the appended claims, taken in conjunction with the accompanying drawings and this background.

SUMMARY

Accordingly, it may be desirable to simplify installation and conversion of overhead bins in the aircraft.

One of various aspects of the present disclosure relates to an overhead bin or hatrack for an aircraft, for example, an airplane. An overhead bin may be a baggage rack that may be suspended over passenger seats. Thus, when a passenger is standing, said baggage rack may be situated at head height or below.

According to an example, the overhead bin comprises a base unit that is designed to fasten the overhead bin to a retaining structure of the aircraft, and a mounting unit that is connected to the base unit. By way of the mounting unit a stowage space of the overhead bin can be accessed, for example by way of a hinged lid. The base unit provides a first stowage space region, and the mounting unit provides a second stowage space region that together with the first stowage space region forms the stowage space of the overhead bin.

In other words, the overhead bin may be considered to be a modular overhead bin that comprises a base unit as a base module or standard module, and that comprises a mounting unit as a variable module. Different variants of the mounting unit can be provided. For example, for the same base unit various differently-designed mounting units may be provided, for example a fixed bin or a moveable bin. In this manner it is possible to select the installation variant after installation of the base unit. System installations and tests may be carried out beforehand, independently of the mounting unit.

It is understood that both the base unit and the mounting unit provide a part of the volume of the stowage space of the overhead bin, both components therefore have a void or hollow space that comprises the respective stowage space region.

Furthermore, the standard module makes it possible to use identical retainers and positions on the retaining structure or primary structure of the aircraft. In this manner the primary structure of the airplane may be produced in advance, irrespective of the installation variant selected at a later stage.

According to an example, the mounting unit is connected to the aircraft only indirectly by way of the base unit. In other words, by detaching the mounting unit from the base unit, said mounting unit may be completely separated from the aircraft. In this manner it is possible to exchange the mounting unit, thus altering the installation variant of the overhead bin, without this requiring major modifications in the aircraft. For example, the mounting unit is screwed to the base unit.

According to an example, the base unit comprises sidewalls that define the first stowage space region. The sidewalls of the base unit may form a box that encloses the first stowage space region. This box may be closed on one side by a rear wall of the base unit.

According to an example, the mounting unit comprises sidewalls that define the second stowage space region. Likewise, the sidewalls of the mounting unit may form a box that encloses the second stowage space region. This box may be closed on one side by a hinged cover or hinged lid. When the two boxes of the base unit and of the mounting unit are placed one on the other, they form the stowage space of the overhead bin, which stowage space may be closed on the rear by a wall of the base unit, and on the front by the hinged cover.

According to an example, the base unit and the mounting unit comprise parallel sidewalls that are interconnected by way of face surfaces. These sidewalls may form a closure, without any opening, of the overhead bin in the direction of the longitudinal axis of the aircraft.

According to an example, the base unit comprises a first opening, and the mounting unit comprises a second opening that is complementary to the first opening of the base unit. These openings may be formed by face surfaces of the sidewalls of the base unit and of the mounting unit. The base unit and the mounting unit may be joined or assembled by way of the first opening and the second opening.

Furthermore, it is possible to equip the base unit with further mounting components, for example a passenger service unit and an associated supply unit. To this effect the base unit may comprise corresponding receiving devices for these mounting components. The base unit may concurrently be used to receive a passenger service channel (PSC), and a passenger service unit by way of the sidewalls of the base unit.

According to an example, the overhead bin comprises a passenger service unit that is designed to supply light and/or air to a passenger located underneath the overhead bin, wherein the base unit comprises a receiving device for the passenger service unit.

The receiving devices in the base unit for the passenger service units and also the interfaces are located in the base unit in the same position. Pre-configuration of the different variants of passenger service units is possible independently of the variant of the mounting unit.

According to an example, the receiving device comprises a channel of uniform cross section, in which channel passenger service units may be arranged at any desired spacing. In this manner the passenger service units may be preconfigured, depending on the seat pitch.

According to an example, the overhead bin comprises a supply unit with an interface for connection to a passenger service unit, wherein the base unit may comprise a receiving device for the supply unit. Supplying the passenger service units may be ensured by way of a central supply module which is, for example, arranged between the frame elements of an airplane. A central interface of the supply unit for several media flows (for example air, current and/or information) may support easy exchangeability and installation. Separate pretesting of the interfaces is already possible without the mounting unit. Moving the installation of these systems backward in time may furthermore reduce the time required for installation in the cabin.

By a standardized interface, different variants of passenger service units may be connected. Irrespective of the configuration of the individual positions of the passenger service units, only one interface to the supply module needs to be operated. Cables that are overlong (due to positioning) for a normal connection of the individual components may be omitted. The interfaces for various installation variants may be identical and may be situated at identical positions. In this manner easy expandability and exchangeability may be achieved.

According to an example, the mounting unit comprises a hinged cover or a hinged lid by which the stowage space of the overhead bin may be accessed. For example, a person in the cabin of the aircraft may open the hinged cover in order to stow an item in the stowage space, and may subsequently close the hinged cover. As a rule, the hinged cover may comprise a pivot axis that extends parallel to a longitudinal direction of the aircraft.

According to an example, the hinged cover is designed in such a manner that during opening it hinges upwards, wherein at least part of the bottom wall of the stowage space of the overhead bin may be formed by a bottom area of the mounting unit. The mounting unit may thus supplement the base unit so that it becomes a fixed bin.

According to an example, the hinged cover is designed in such a manner that during opening it hinges downwards, wherein at least part of the bottom area of the stowage space may be formed by the hinged cover. The mounting unit may thus supplement the base unit so that it becomes a movable bin.

One of various aspects of the present disclosure relates to an airplane with a passenger cabin in which an overhead bin is incorporated or installed, as described above and below.

One of various aspects of the present disclosure relates to an installation system for an aircraft for assembling an overhead bin, as described for example above and below.

According to an example, the installation system comprises a base unit and at least two differently constructed mounting units that are designed to be connected with the base unit to form an overhead bin. By the installation system it is possible, for example, to preinstall several base units in the aircraft without having to know which installation variants of overhead bins will ultimately be installed. At a later point in time the base units may then be supplemented with the desired installation variant.

According to an example, the installation system comprises a passenger service unit for installation in a receiving device of the base unit and/or a supply unit with an interface for connection to the passenger service unit. The installation system may comprise further mounting components that may be preinstalled together with the base unit.

One of various aspects of the present disclosure relates to a method for installing an overhead bin in an aircraft. It is understood that features of the overhead bin and of the installation system may be features of the method and vice versa.

According to an example, the method comprises: fastening a base unit to a retaining structure of the aircraft, wherein the base unit provides a first stowage space region of the stowage space of the overhead bin. The base unit may be preinstalled in the aircraft independently of the mounting unit. Furthermore, various panels, for example a sidewall panel and/or a cover for an air inlet, and a standard unit, for example the supply unit, may be preinstalled. Moreover, the base unit with further mounting components, for example an air hose and/or cabin illumination, may be preinstalled on the primary structure.

Overall, the method makes it possible to install overhead bins in a standardized manner and to later adapt the variable mounting components.

According to an example, the method comprises: connecting a mounting unit to the base unit, wherein the mounting unit provides a second stowage space region that with the first stowage space region forms the stowage space of the overhead bin, and wherein by way of the mounting unit the stowage space of the overhead bin may be accessed. In a second step, which may be carried out separately in time from the first step, it is possible to install only the mounting units and the passenger service units, for example in accordance to a customer's request.

According to an example, the method comprises: exchanging the mounting unit with a differently designed mounting unit. In this manner the expense for reconfiguring different installation variants may be reduced.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
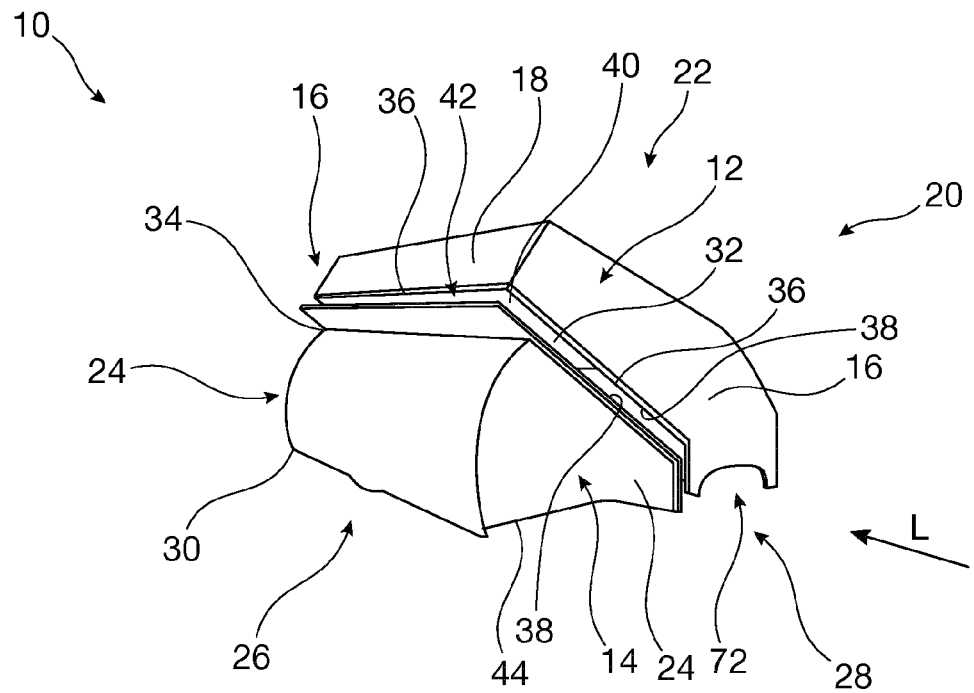
FIG. 1A shows a three-dimensional view of an overhead bin according to an example.

FIG. 1A shows an overhead bin 10 that comprises a base unit 12 and a mounting unit 14. The overhead bin 10 comprises a modular design with the two modules 12, 14.

The base unit 12, which may be fastened to a retaining structure of an airplane, comprises several sidewalls 16, 18 that enclose a stowage space region 20 in a box-like manner. Furthermore, the base unit 12 comprises a rear wall 22 that is curved in such a manner that the base unit may be placed against the circular frame elements of an airplane. In the installed state the sidewalls 16 are situated so as to be perpendicular on a longitudinal axis of the aircraft, and the rear wall 22 extends parallel to this longitudinal direction.

The mounting unit 14 also comprises sidewalls 24 that enclose a stowage space region 26 in a box-like manner. When the mounting unit 14 is connected to the base unit, the stowage space 28 of the bin 10 is formed from the two stowage space regions 20, 26.

At its front the mounting unit 14 comprises a hinged lid 30 by way of which the stowage space 28 can be accessed. In the installed state the sidewalls 24 are situated so as to be perpendicular on a longitudinal axis of the airplane, and the hinged lid 30 extends parallel to this longitudinal direction. The hinged lid 30 may be hinged on a pivot axis 32 parallel to the longitudinal direction and may be opened upwards. In this arrangement the pivot axis 32 is affixed to an upper section of the mounting unit 14.

Above the pivot axis 32 the mounting unit 14 also comprises a faceplate-like wall 34 that closes off the stowage space 28 towards the outside.

For connecting the mounting unit 14 to the base unit 12 the walls 24, 34 of the mounting unit and the walls 16, 18 of the base unit 12 comprise steps 36 by way of which the two units 12, 14 are insertable one into the other so that a planar outside contour of the bin 10 results. In this manner the parallel sidewalls 16, 24 may be interconnected by their face surfaces 38 so that a continuous sidewall of the bin 10 results.

Due to the face surfaces 38, in the base unit 12 an opening 40 is formed onto which a corresponding complementary opening 42 of the mounting unit 14 may be placed.

After inserting one into the other, the two units 12, 14 may, for example, be screwed together.

In the installation variant shown in FIG. 1A the mounting unit 14 forms a bin 10 in the form of a fixed bin in which the hinged lid 30 may be opened upwards, and in which a bottom wall 44 of the mounting unit 14 forms a section of the bottom of the bin 10.

Figure 1B:
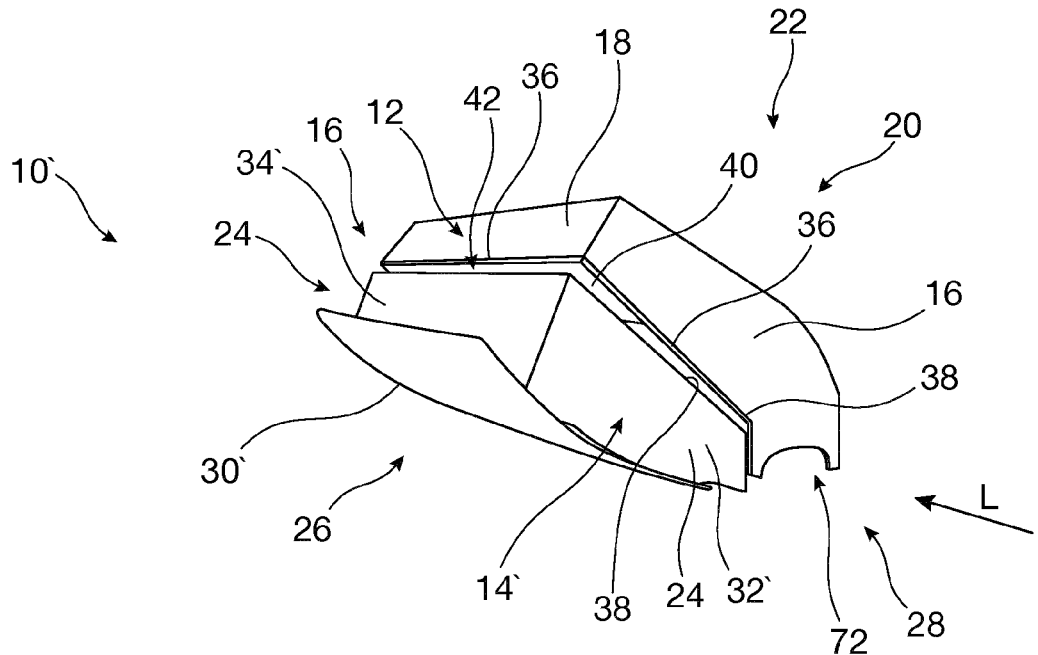
FIG. 1B shows a three-dimensional view of an overhead bin according to a further example.

FIG. 1B shows an embodiment of an overhead bin 10' that comprises the (same) base unit 12 and an alternative mounting unit 14'. The mounting unit 14' comprises two parallel sidewalls 24 and a hinged lid 30' that may be hinged on a pivot axis 32' in the lower region of the mounting unit 14'. In the upper section the mounting unit 14' comprises a sidewall 34' that closes off the stowage space 28 from the surroundings.

In the installation variant shown in FIG. 1B, the mounting unit 14' forms a bin 10' in the form of a movable bin in which the hinged lid 30' may be opened downwards and in which the hinged lid 30' of the mounting unit 14' forms a section of the bottom of the bin 10'.

Figure 2:
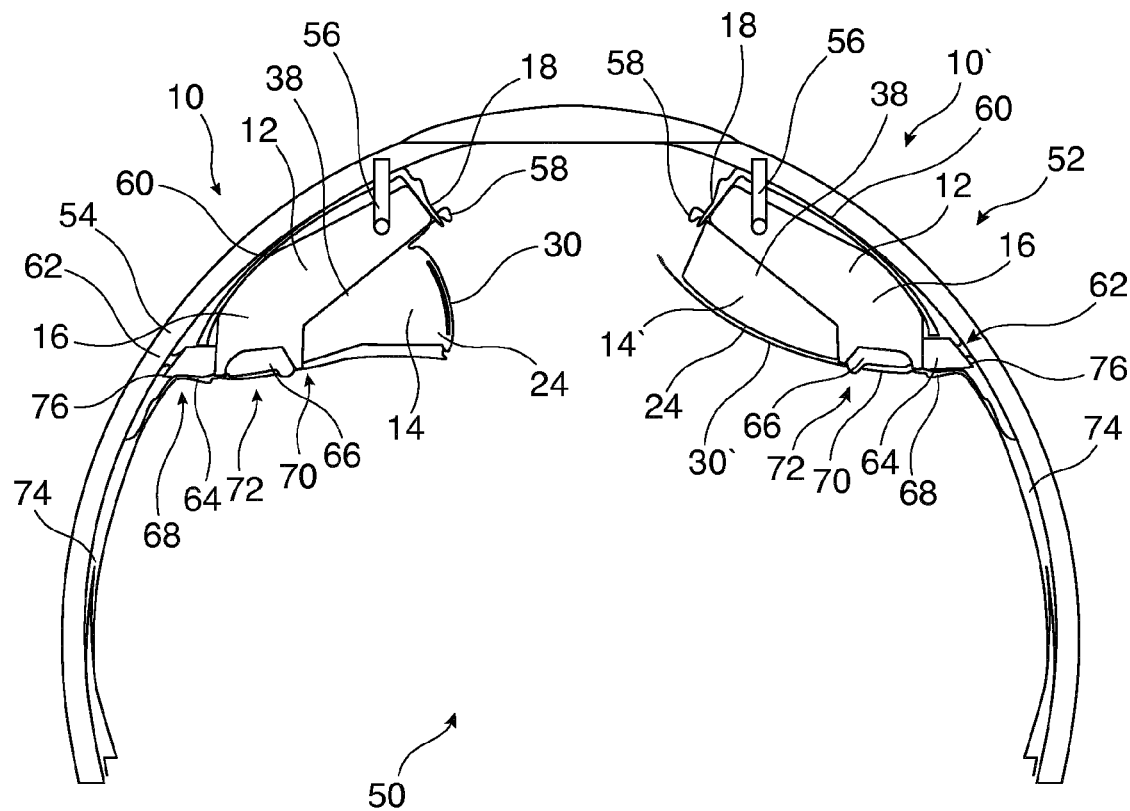
FIG. 2 shows a view of a cabin space according to one example.

FIG. 2 shows a view of a cabin 50 or of a cabin space 50 in the direction of the longitudinal direction of an aircraft 52. Two overhead bins 10, 10' are fastened in the cabin 50 so that they are symmetrical to the centre axis of the aircraft 52.

The base units 12 of the overhead bins 10, 10' are connected, by way of standard fastening elements 56, for example metal strips, to circular frame elements 54 that enclose the cabin 50. The frame elements 54 form part of a retaining structure or primary structure of the aircraft 52. If the base units 12 are designed so as to be mirror symmetrical, the same type of base unit 12 may be used for the left-hand side and for the right-hand side of the aircraft 52.

The mounting units 14, 14' are only connected indirectly, by way of the base units 12, to the aircraft 52. As shown in FIG. 2, the face surfaces 38 of the sidewalls 16, 24 extend obliquely to a bottom area of the cabin 50. In this arrangement the face surfaces are arranged in such a manner that they extend approximately parallel to the direction of extension of the hinged cover 34, 34' or of the rear wall 22 of the base unit 12.

Further mounting components, possibly pre-installed, may be mounted to the base unit 12, which mounting components include, for example, an air inlet 58 that may be fastened to the sidewall 18 and that is supplied with air by way of a line 60 that extends behind the base unit 12 and its rear wall 22.

The line 60 leads to a passenger service channel 62, arranged laterally behind the respective base unit 10, 10'. In the passenger service channel 62, supply units 64 are arranged that may supply the passenger service units 66 with air, current, and/or data.

Further faceplates may be affixed to the base units 12, such as for example a standard cover 68 with a downwards-facing air inlet, or cover panels 70 that may be tailored to the passenger service units 66.

For fastening a passenger service unit 66, the base unit 12 comprises a receiving device 72, formed from a channel 62 of uniform cross section.

Furthermore, FIG. 2 shows sidewall panels 74 that form part of the wall of the cabin 50. The sidewall panels 74 extend essentially parallel to the frame elements 54. An upper section 76 of a sidewall panel 74 may project from the frame elements 54 and may form part of the lining of the base unit 12 in the region of the passenger service channel 62.

Figure 3:
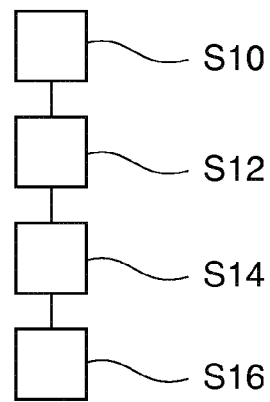
FIG. 3 shows a flow chart for a method for installing an overhead bin according to an example.

FIG. 3 shows a flow chart for a method for installing one or several overhead bins 10, 10' in the aircraft 52.

At S10, a base unit 12 is fastened to the retaining structure 54 of the aircraft 52. For example, the base unit is screwed to the frame elements 54 by way of the fastening elements 56.

At S12, the supply unit 64 and the passenger service unit 66 are fastened to the base unit and are interconnected, for example by way of a standard interface. Furthermore, further covering elements or panels 70 may be attached to the base unit, which covering elements or panels 70 may, for example, be fastened by way of snap connections. Likewise, the sidewall panels 74 may be attached.

At step S14, a mounting unit 14, 14' is connected to the base unit 12. S12 may be carried out so as to be separate in time from S10, for example when the cabin 50 is to be adapted to specific customer requests. There is no need for any deinstallation or reconfiguration of the panels 70, 74 or of the supply unit 64 and of the passenger service unit 66.

Following S14, construction of the overhead bin 10, 10' is complete, with the overhead bin 10, 10' being ready for use.

At an optional S16, for example during reconfiguration of the aircraft 52 or of the cabin 50 or for exchanging a defective mounting unit 14, 14', the mounting unit 14, 14' is removed and replaced with an identically constructed or a differently constructed mounting unit 14, 14'. The panels 70, 74, the supply unit 64, or the passenger service unit 66 need not be removed for this.

Figure 4A:
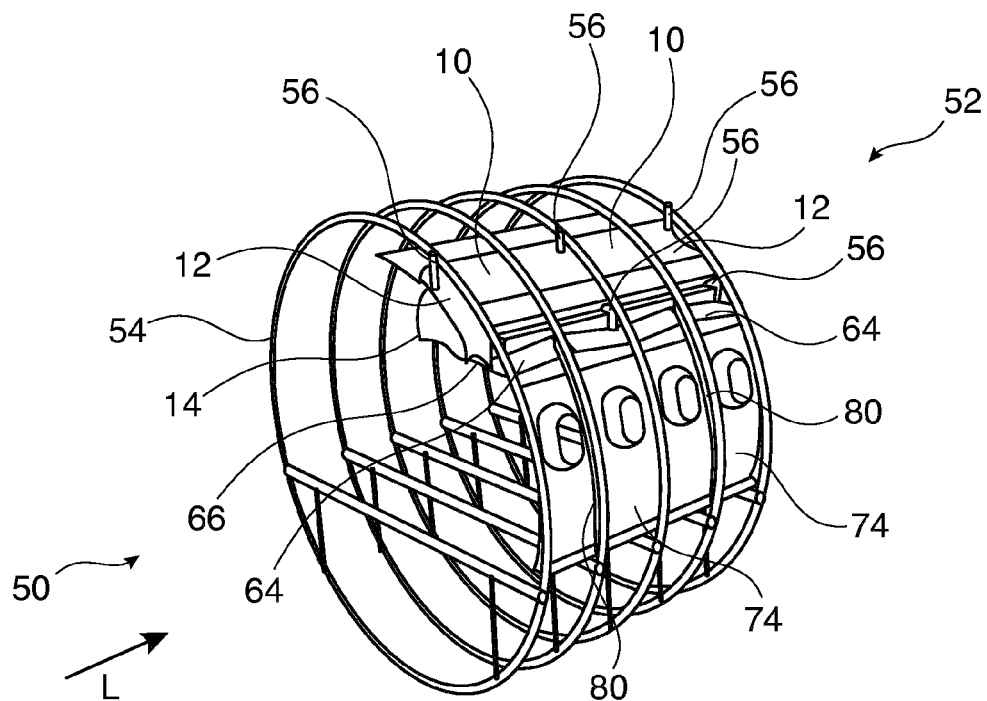
FIG. 4A shows a three-dimensional view of a cabin space according to an example.

FIG. 4A shows a cabin 50 or a cabin space 50 in which a number of overhead bins 10 are arranged consecutively in a longitudinal direction L of the aircraft 52. As shown in FIG. 4A, the base units 12 in longitudinal direction L have the same width as the sidewall panels 74. The same applies to the mounting units 14. However, the mounting units 14 may also be narrower than the base units 12. For example, a base unit 12 may be twice as wide as a mounting unit 14 so that with one base unit an overhead bin 10 comprising two hinged covers 34 may be constructed.

FIG. 4A further shows that each supply unit 64 extends from the bottom by way of a line 80 that extends behind the sidewall panels 74. By way of the line 80 a supply unit 64 may be supplied with air, current, or data.

Figure 4B:
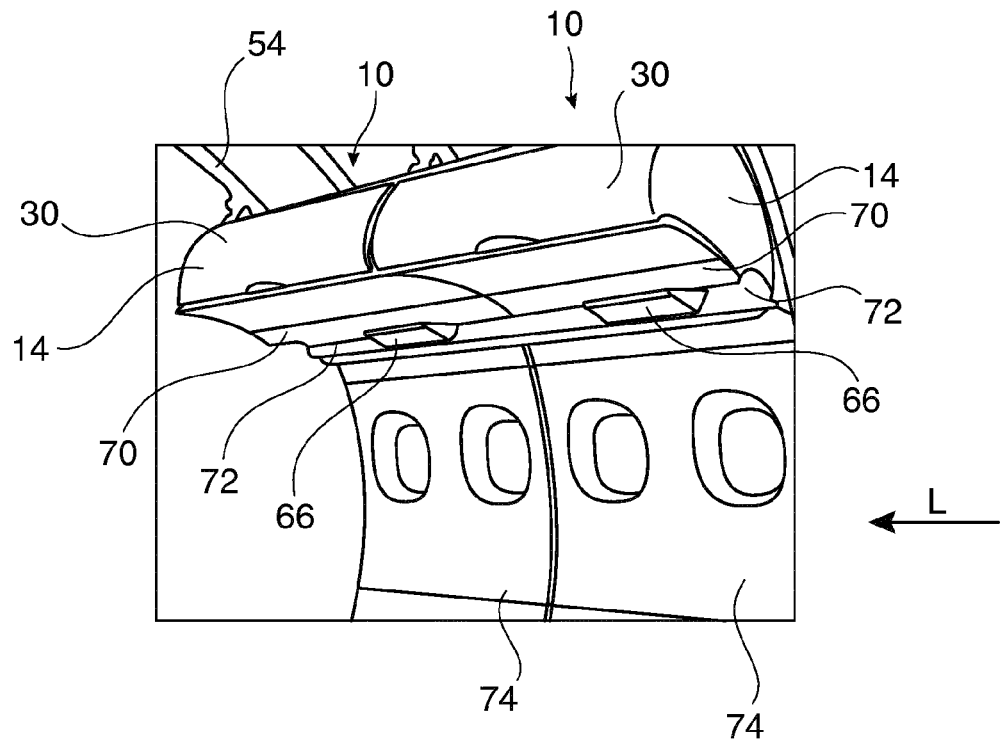
FIG. 4B shows the cabin space of FIG. 4A from a different angle of view.

FIG. 4B shows the cabin space 50 of FIG. 4A from a direction of view as might be taken up by a person in the cabin 50. FIG. 4B shows that each of the overhead bins 10 comprises a channel 72. The channels 72 of two adjacent overhead bins 10 merge. In this channel the passenger service units 66 may be arranged at a space during installation, which space is matched to the seat pitch of seat rows underneath the overhead bins 10. Between the passenger service units 66, further faceplates or panels may be inserted into the channels 72, which faceplates or panels are matched to the seat pitch of the seat rows and cover the channels 72.

Figure 5A:
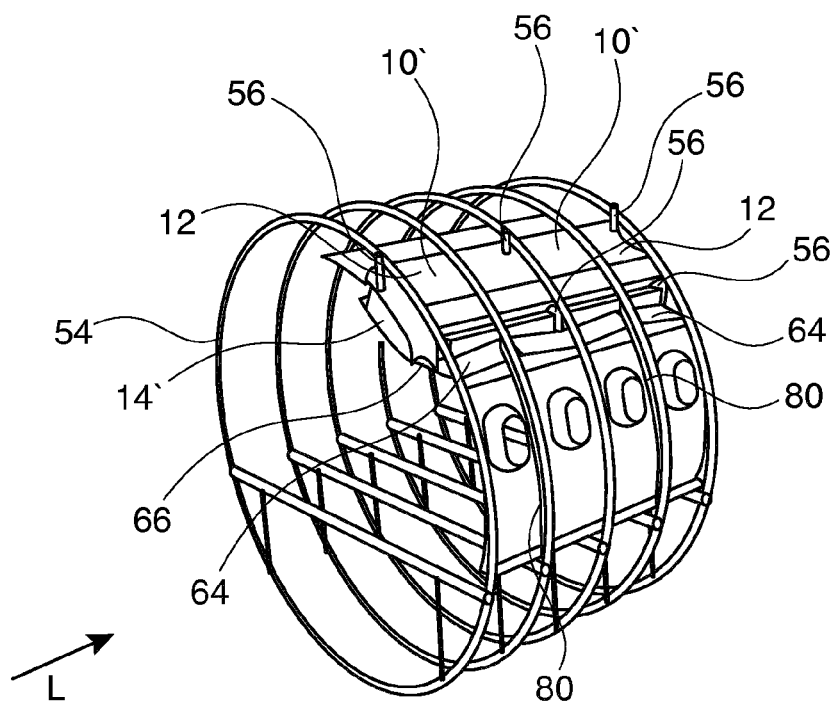
FIG. 5A shows a three-dimensional view of a cabin space according to an example.
Figure 5B:
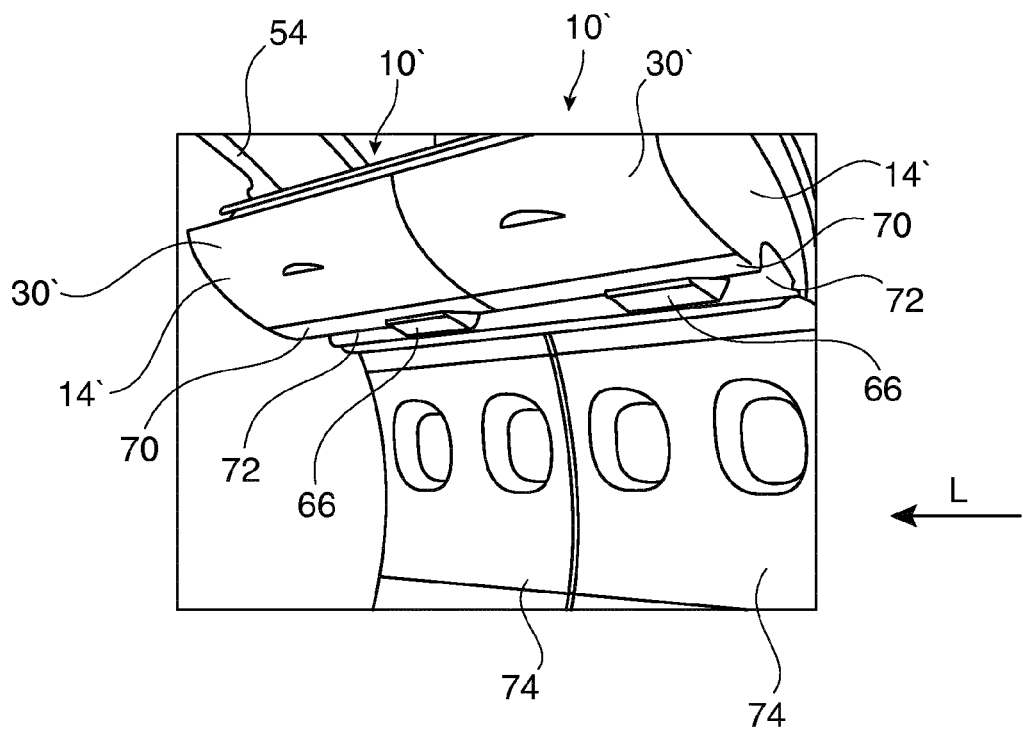
FIG. 5B shows the cabin space of FIG. 5A from a different angle of view.

FIGS. 5A and 5B show a cabin space 50 analogous to that shown in FIGS. 4A and 4B with overhead bins 10'. Except for the base units 14' the remaining components of the cabin space 50 may be selected, irrespective of the design or of the variant of the base unit 14', identically to those of FIGS. 4A and 4B.

Figure 6:
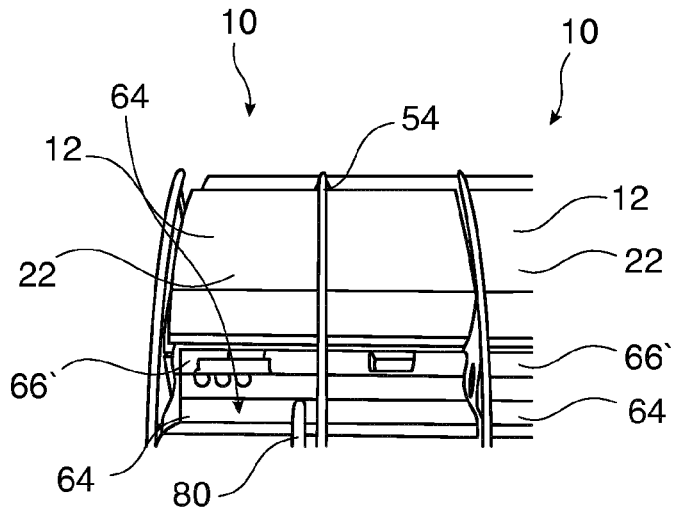
FIG. 6 shows a three-dimensional view of the rear of a base unit according to an example.

FIG. 6 shows the rear of a further embodiment of a base unit 12. As shown in FIG. 6, at the lower end of the base unit 12 a supply unit 64 and a passenger service unit 66' are attached. In this arrangement the passenger service unit 66' is not attached in a channel at the lower end of the base unit 12, but instead in a region between the base unit 12 and the frame elements 54.

Figure 7A:
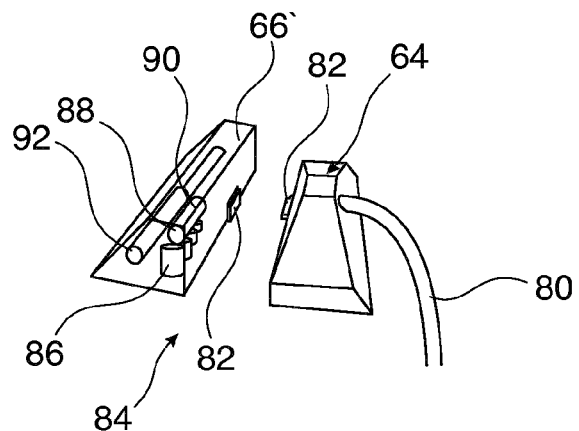
FIG. 7A shows a three-dimensional view of a supply unit and a passenger service unit according to an example.

FIG. 7A shows a three-dimensional view of a supply unit 64 and of a passenger service unit 66', which both comprise a plug-type connection 82 for a standard interface 84. In this manner it is possible to connect various embodiments of passenger service units 66' to the same supply unit 64 without the latter having to be exchanged.

A passenger service unit 66, 66' may, for example, comprise a reading light 86, a loudspeaker 88, a nozzle 90, an oxygen mask 92 as well as informative signs that light up.

Figure 7B:
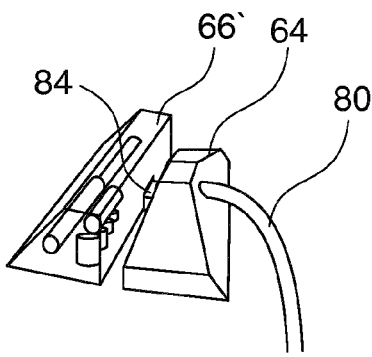
FIG. 7B shows the supply unit and the passenger service unit from FIG. 7A in a connected state.

FIG. 7B shows the supply unit 64 and the passenger service unit 66' of FIG. 7A in a connected state in which the plug-type connections 82 are plugged into each other.

Figure 8:
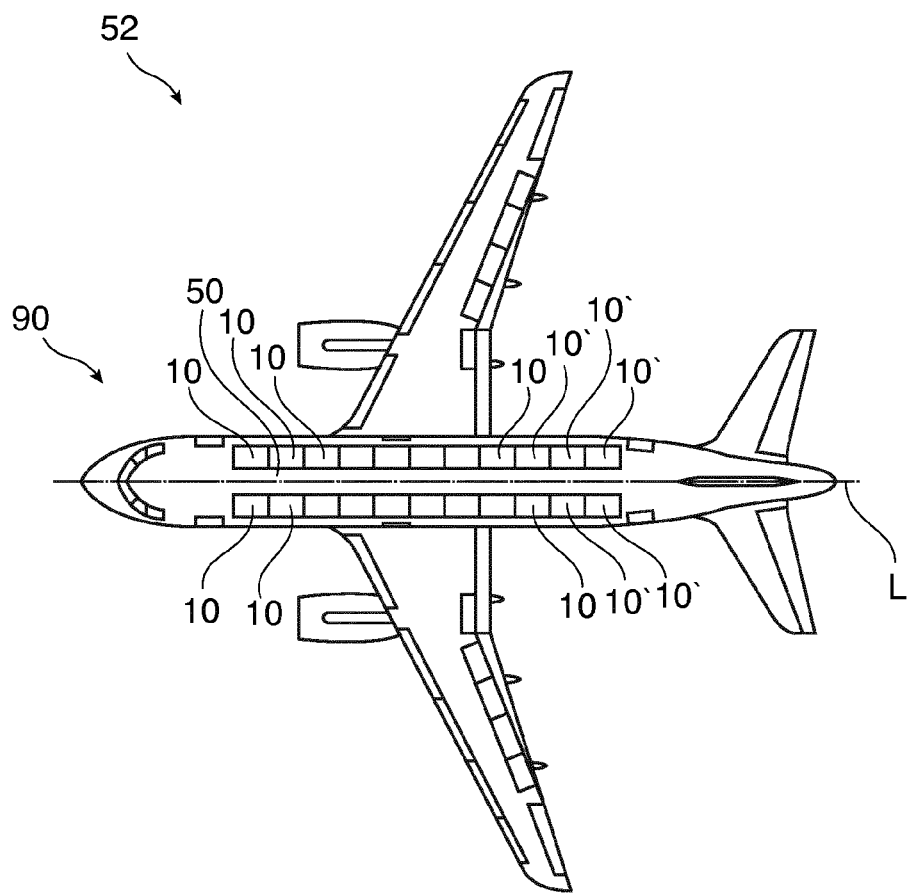
FIG. 8 shows an aircraft according to an example.

FIG. 8 shows an aircraft or airplane 52 in which two parallel rows of overhead bins 10, 10' have been installed in a cabin 50, which rows extend parallel to the longitudinal axis L. The cabin 50 may be a passenger cabin 50 of the airplane 52.

With reference to FIGS. 1A and 1B, the base unit 12 and the mounting units 14, 14' may be considered to be an installation system 90 by which rows of overhead bins 10, 10' may be constructed. Likewise, the passenger service units 66, 66', the supply units 64 and the panels 70, 74 are components of this installation system 90.

In addition, it should be pointed out that "comprising" does not exclude other elements or steps, and "a" or "one" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

While at least one exemplary embodiment has been presented in the foregoing detailed description of the present disclosure, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure, it being understood that various changes may be made in the function and arrangement of elements described in an exemplary embodiment without departing from the scope of the present disclosure as set forth in the appended claims and their legal equivalents.

What is claimed is:

1. An overhead bin for an aircraft, comprising:
   a standard module base unit configured to be fastened to a retaining structure of the aircraft, and configured to be interchangeably connected to a plurality of differently designed mounting unit variants;
   a mounting unit that is connected to the base unit to form a fixed overhead bin and to define an accessible stowage space of the fixed overhead bin; and
   a hinged lid connected to the mounting unit on a pivot axis, wherein a front of the accessible stowage space is covered by the hinged lid when the hinged lid is closed;
   wherein the base unit comprises parallel base unit sidewalls and a base unit rear wall defining stowage space of the base unit, and the mounting unit comprises parallel mounting unit sidewalls and a mounting unit bottom wall defining a stowage space region that together with the stowage space of the base unit forms the accessible stowage space of the fixed overhead bin,
   wherein the base unit sidewalls terminate at corresponding sidewall face surfaces of the base unit, the mounting unit sidewalls terminate at corresponding sidewall face surfaces of the mounting unit, and the mounting unit sidewalls are interconnected to the base unit sidewalls by way of the sidewall face surfaces to form continuous sidewalls of the fixed overhead bin, wherein the base unit comprises a first opening defined by the sidewall face surfaces of the base unit, and the mounting unit comprises a second opening, defined by the sidewall face surfaces of the mounting unit, that is complementary to the first opening of the base unit, wherein the base unit and the mounting unit are joined via the first opening and the second opening such that the accessible stowage space of the fixed overhead bin is defined by the base unit sidewalls, the mounting unit sidewalls, the base unit rear wall, the mounting unit bottom wall, and the hinged lid when closed.

2. The overhead bin of claim 1, wherein the mounting unit is connectable to the aircraft only indirectly via the base unit.

3. The overhead bin of claim 1, further comprising:
at least one passenger service unit that is configured to supply at least one of light and air to a passenger seated underneath the overhead bin;
wherein the base unit comprises a receiving device for the passenger service unit.

4. The overhead bin of claim 3, wherein the receiving device comprises a channel of uniform cross section, in which the at least one passenger service unit is arrangeable.

5. The overhead bin of claim 1, further comprising:
a supply unit with an interface for connection to a passenger service unit.

6. The overhead bin of claim 1, wherein the hinged lid is configured to move upward during opening.

7. The overhead bin of claim 1, wherein the hinged lid is configured to move downward during opening.

8. An installation system for an aircraft for coupling overhead bins to the aircraft, with the installation system comprising:
a standard module base unit configured to be fastened to a retaining structure of the aircraft, and configured to be interchangeably connected to a plurality of differently designed mounting unit variants;
a first mounting unit variant configured to be connected to the base unit to form a fixed overhead bin and to define an accessible stowage space of the fixed overhead bin, the first mounting unit variant comprising a stowage space region that cooperates with stowage space provided by the base unit to form the accessible stowage space of the fixed overhead bin when the first mounting unit variant is connected to the base unit; and
a second mounting unit variant configured to be connected to the base unit to form a movable overhead bin and to define an accessible stowage space of the movable overhead bin, wherein the first mounting unit variant and the second mounting unit variant are non-identical in configuration, the second mounting unit variant comprising a stowage space region that cooperates with the stowage space provided by the base unit to form the accessible stowage space of the movable overhead bin when the second mounting unit variant is connected to the base unit;
wherein the base unit comprises parallel base unit sidewalls and a base unit rear wall defining the stowage space of the base unit;
wherein the first mounting unit variant comprises parallel mounting unit sidewalls and a mounting unit bottom wall defining the stowage space region of the first mounting unit variant; and
wherein the base unit sidewalls terminate at corresponding sidewall face surfaces of the base unit, the mounting unit sidewalls terminate at corresponding sidewall face surfaces of the mounting unit, and the mounting unit sidewalls are interconnected to the base unit sidewalls by way of the sidewall face surfaces to form continuous sidewalls of the fixed overhead bin.

9. An overhead bin for an aircraft, comprising:
a standard module base unit configured to be fastened to a retaining structure of the aircraft, and configured to be interchangeably connected to a plurality of differently designed mounting unit variants, the base unit comprising parallel base unit sidewalls and a base unit rear wall defining stowage space of the base unit; and
a mounting unit that is connected to the base unit to form an overhead bin, the mounting unit comprising parallel mounting unit sidewalls and a mounting unit bottom wall defining a stowage space region, wherein the stowage space of the base unit and the stowage space region of the mounting unit form an accessible stowage space of the overhead bin;
wherein the base unit sidewalls terminate at corresponding sidewall face surfaces of the base unit, the mounting unit sidewalls terminate at corresponding sidewall face surfaces of the mounting unit, and the mounting unit sidewalls are interconnected to the base unit sidewalls by way of the sidewall face surfaces to form continuous sidewalls of the overhead bin;
wherein the base unit comprises a first opening defined by the sidewall face surfaces of the base unit, and the mounting unit comprises a second opening, defined by the sidewall face surfaces of the mounting unit, that is complementary to the first opening; and
wherein the base unit and the mounting unit are joined via the first opening and the second opening such that the accessible stowage space of the overhead bin is defined by the base unit sidewalls, the mounting unit sidewalls, the base unit rear wall, and the mounting unit bottom wall.

* * * * *